United States Patent [19]

Scott et al.

[11] Patent Number: 4,574,643

[45] Date of Patent: Mar. 11, 1986

[54] TWO PHASE FLOWMETER

[75] Inventors: Donald S. Scott; Edward Rhodes, both of Waterloo, Canada

[73] Assignee: Alberta Oil Sands Technology and Research Authority, Edmonton, Canada

[21] Appl. No.: 666,805

[22] Filed: Oct. 31, 1984

[51] Int. Cl.[4] .......................... G01F 1/74; G01F 15/08
[52] U.S. Cl. .................... 73/861.04; 73/195; 73/200; 364/510
[58] Field of Search .................. 73/153, 19, 195, 196, 73/198, 200, 861.04; 364/510

[56] References Cited

U.S. PATENT DOCUMENTS

| 1,927,577 | 9/1933 | Stone | 73/861.04 |
| 3,386,286 | 6/1968 | Moore | 73/153 |
| 3,525,258 | 8/1970 | Fowler et al. | 73/198 |
| 4,178,801 | 12/1979 | Cassell et al. | 73/200 X |
| 4,282,760 | 8/1981 | Pitts, Jr. et al. | 73/861.04 X |
| 4,312,234 | 1/1982 | Rhodes et al. | 73/861.04 |
| 4,429,581 | 2/1984 | Furmaga | 73/861.04 |

FOREIGN PATENT DOCUMENTS

| 0571856 | 9/1977 | U.S.S.R. | 73/19 |
| 1065734 | 1/1984 | U.S.S.R. | 73/19 |

Primary Examiner—Charles A. Ruehl
Attorney, Agent, or Firm—Millen & White

[57] ABSTRACT

The tubular flowmeter is capable of measuring two different physical parameters in a flowing mixture of liquid and gas (such as wet steam). These measurements are such that they can be used to determine the individual gas and liquid flowrates. The flowmeter comprises first means, such as an orifice plate or a twisted tape, for causing an accelerational or frictional pressure drop in the total flow. Suitable means measure such pressure drop. Downstream of the first means, is positioned means for inducing rotational motion of the total flow, to cause the mixture to separate while remaining within the same conduit into discrete liquid and gas flows. Such means may comprise a rib extending helically along the inner surface of the flowmeter. Means, such as a pitot-static tube assembly, measure a pressure head indicative of the velocity of the gas flow. Downstream from this velocity measurement device, the two phases are permitted to mix freely again, all the time remaining within the same conduit. The total flow pressure drop and gas flow velocity head measurements are used to compute or determine the individual gas and liquid flowrates.

8 Claims, 6 Drawing Figures

TWO PHASE FLOWMETER

BACKGROUND OF THE INVENTION

1. Field of the Invention

The present invention relates to a flowmeter of the type adapted to measure two different physical phenomena or parameters pertaining to a mixed gas and liquid flow in a conduit. From the two measurements obtained, the individual flow rates for the liquid and the gas may be determined by the use of suitable equations. The flowmeter was developed to monitor wet steam streams, although its use is not limited to that application and the flowmeter could readily be used also for the measurement of two phase flows containing two or more components. It could also be adapted for use with gas-slurry flows which may contain more than two phases.

2. Prior Art

The measurement of fluid flow is required in many applications for process control and monitoring.

In two- or multi-phase flow, it is usually desirable to obtain values of the individual phase flowrates.

The accurate metering of the individual phase flow rates in a two phase flow poses difficulties, because neither the density nor the velocity of the fluid remains constant. Thus variations in one parameter are difficult to distinguish from variations in the other parameter.

Among the commonly employed instruments for the measuring of fluid flow are the pitot-static tube meter, the orifice plate meter, and the venturi meter. While these meters are accurate in single phase fluid metering, their accuracy in two-phase flow is limited, because of the aforementioned physical fluctuations. These meters function to create and measure pressure drops due to acceleration or deceleration effects in a closed conduit.

A number of flowmeters are known which monitor two-phase flow by taking two or more independent measurements of different physical parameters of the two-phase flow.

One such flowmeter is disclosed in our earlier U.S. Pat. No. 4,312,234. This meter is operative to create and measure frictional and accelerational pressure drops in a mixture flow. These pressure drops may be correlated with flow rates by the use of theoretical two-phase mathematical models. The device utilizes a twisted tape positioned in the flow to create a frictional pressure drop, and a venturi, for the production of an accelerational pressure drop. Pressure transducers monitor the pressure differentials across the twisted tape and the venturi.

A different approach for the determination of individual gas and liquid flow rates in a two-phase flowstream is exemplified in U.S. Pat. No. 4,178,801, issued to Cassell et al. That patent discloses a centrifugal vapour-liquid separator mounted in the vapour drum of a utility boiler. Such an assembly is principally employed for the physical separation and removal of the liquid phase from the vapour phase, so as to produce substantially liquid-free vapour. It is advantageous in operating such a separator to be apprised for the individual phase flow rates of the two-phase flowstream. Pressure and pressure drop sensors are thus provided in and across the separator. The flowrate of the two-phase flow stream and the flow rates of the individual phases are computed by measuring the pressure differential across the separator, the pressure differential across the flow of the separated vapour phase, and specific absolute pressures. These pressure measurments are correlated with flow rates by the use of mathematical models specific to the separator. This metering technique would, however, not be applicable in the uses contemplated by the flowmeter of the present invention demanding, as it does, the permanent separation of liquid from vapour phase, and two independent flow channels.

Other flowmeters are known which monitor two-phase flow by taking and computing two measurements against theoretical mathematical models. One such meter combines a gamma ray densitometer and a turbine meter. Both of these devices are relatively expensive and not ideal for field use. A second meter proposes the use of a pair of segmental orifices positioned in a conduit. However, the applicability of this meter to general two-phase flow metering is restricted by the limited operating range in which accurate measurements can be made. Both meters have been developed, usually to meet the demands of certain specific applications.

While the two-phase flowmeter disclosed in our '234 patent provided a rugged, inexpensive and accurate meter, the calculations and computations required to arrive at the desired mass flowrates proved exceedingly complex.

Accordingly, there was a need to provide an equally rugged, inexpensive and accurate multi-phase flowmeter which monitors parameters which can more easily be correlated with flow rates, by the use of less complex theoretical mathematical models.

SUMMARY OF THE INVENTION

In accordance with the present invention, we provide a flowmeter comprising a tubular body or member which incorporates two measuring devices operating in series. One such device induces or causes a frictional or accelerational pressure drop in the total flow of liquid-gas mixture and allows this drop to be measured producing a signal indicative of the magnitude thereof. The other device separates the mixture into distinct liquid and gas phase flows within the same conduit and allows a measurement to be made of the velocity of the gas flow. These measurements or signals can then be used to calculate the individual liquid and gas flowrates or, alternatively, they can be compared against calibrated results, to yield the desired individual rates.

The one device may comprise a means for causing a frictional pressure drop, such as a twisted tape insert, operatively coupled with a means for measuring such drop and producing a signal indicative thereof. Alternatively, the device may comprise a means for causing an accelerational pressure drop, such as an orifice plate, a venturi, or a flow nozzle, operatively coupled with a means for measuring the drop and producing a signal indicative thereof.

The other device may comprise means for inducing rotational motion in the total flow, to separate it within the same conduit into an outer liquid flow and an inner gas flow, coupled with means for measuring a pressure head indicative of gas flow velocity and producing a signal indicative thereof. Preferably, a helical rib, extending along the inner surface of the tubular member, is used to impart rotational motion. A pitot tube, most preferably a shielded pitot-static tube, is preferably provided at or near the central axis of the tubular member to make the velocity-oriented measurement. Suitable means are coupled with the pitot tube to produce the signal indicative of the gas flow velocity.

The invention lies in the combination of devices used. This combination permits one to:
1. measure one physical parameter, frictional or accelerational pressure drop of the total flow of mixture;
2. induce separation within the same conduit of the mixture into separate gas and liquid flows; and
3. measure a different parameter, a pressure difference indicative of velocity, which is characteristic of the gas flow.

The two pressure difference measurements obtained can be made to yield the individual gas and liquid flowrates of the mixture (or other derivable quantity such as total mass flowrate or quality), by either:
(a) comparison against calibrated results, or
(b) calculations, using theoretical relationships combined with empirical factors dependent on the particular devices used.

Figure 1:
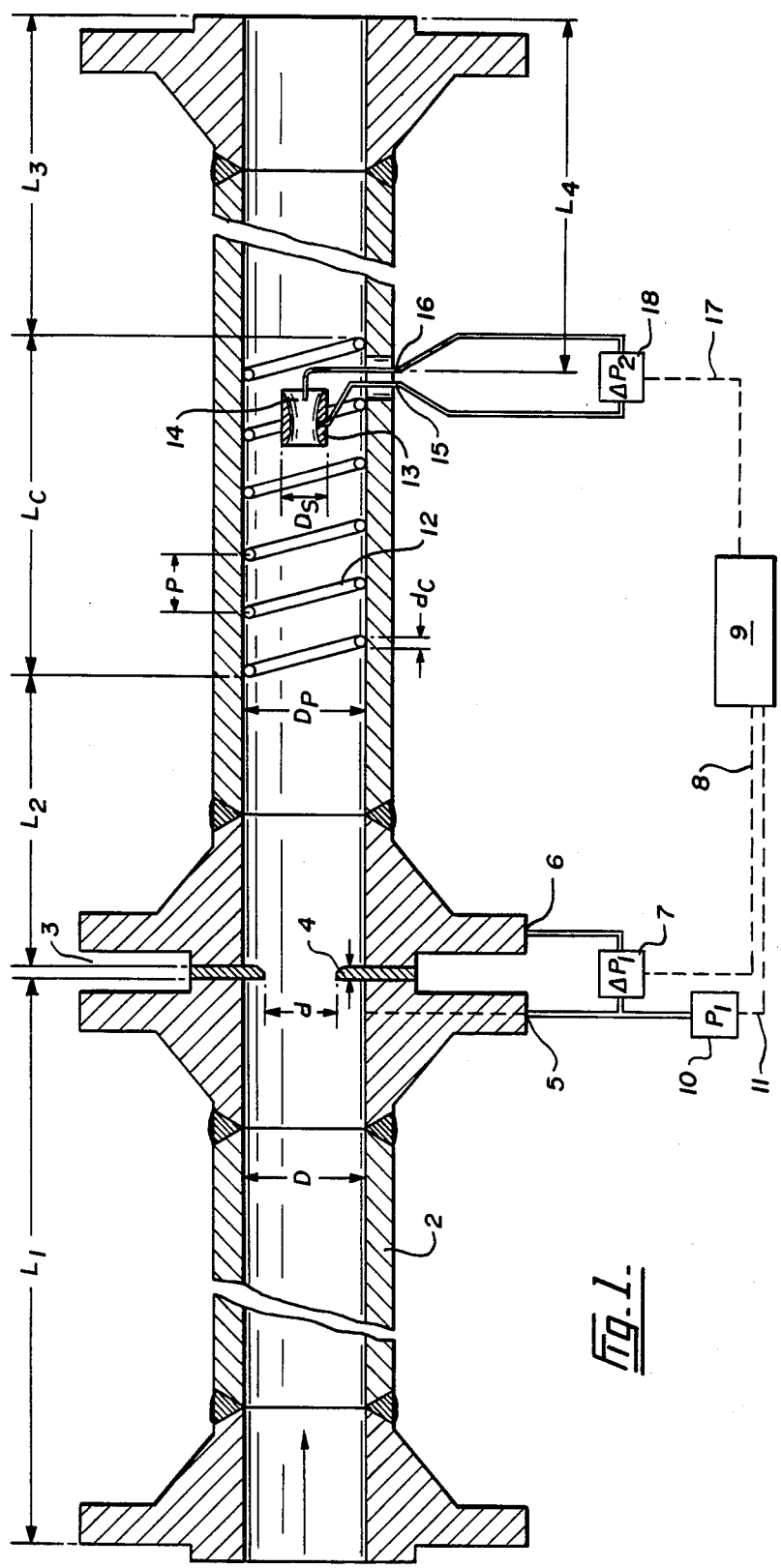
FIG. 1 is illustrative of a preferred embodiment of the device in which an orifice meter is utilized as the means for creating and measuring the upstream pressure differential, a helical rib separator is used to separate liquid and gas, and a shielded pitot-static tube is used to measure the gas flow pressure head.
Figure 2:
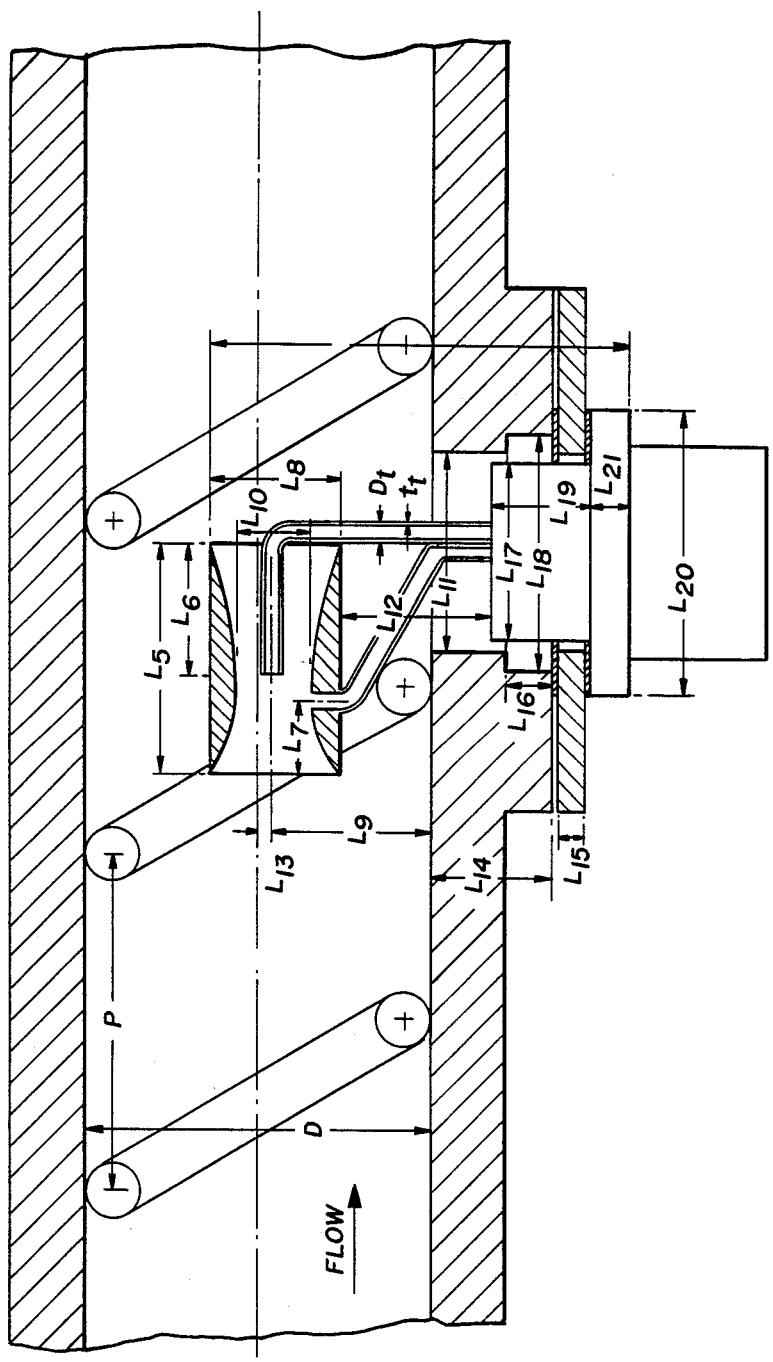
FIG. 2 is a more detailed sectional-side view of a preferred shielded pitot-static tube positioned within the rib separator assembly.

With reference to the Figures, the flowmeter 1 is shown in its preferred embodiment in FIGS. 1 and 2.

More particularly, the flowmeter 1 comprises a tubular member 2, adapted to be connected into the flow conduit (not shown).

The tubular member 2 has a conventional orifice plate meter 3 mounted in its inlet end. The meter 3 comprises an orifice plate 4 upstream and downstream flange taps 5, 6, a pressure transducer 7 (Validyne Model DP-7) operative to measure the pressure difference between the taps 5, 6 and produce a signal indicative or proportional of such pressure difference, and a pressure transducer 10 (Validyne Model DP-7) having one side at atmospheric pressure, operative to measure the static pressure at tap 5, and produce a signal proportional to the said static pressure. These signals are transmitted through the line 8 and 11 to a microprocessor 9.

Downstream of the orifice plate 4, there is provided a helically extending rib 12 protruding inwardly from the inner surface of the member 2. Preferably, the rib depth should be equal to $\frac{1}{4}$ to 1/10 of the pipe diameter and have a pitch of 0.5 to 3 diameters.

At the downstream end of the rib section, a shielded pitot-static tube 13 is mounted in the tubular member 2, so that its axis and entrance 14 coincide with the longitudinal axis of said member 2. The pressure lines 15, 16 of the pitot-static tube 13 measure the static and total pressures of the gas flow. They are connected to a conventional differential pressure transducer 18 (e.g. Validyne Model DP-7), which is operative to produce a signal indicative of or proportional to the dynamic pressure of the gas flow (which is related to the velocity of the gas flow). This signal is transmitted through the line 17 to the microprocessor 9.

This assembly is operative to carry out the following functions. The orifice plate 4 provides means for inducing an accelerational pressure drop in the total flow of mixture passing through the member 2. The taps 5, 6 and transducer 7 provide means for measuring the pressure change and producing a signal proportional to such change. The rib 12 is operative to induce rotational motion in the mixture flow, to cause it to separate into an outer liquid flow and an inner gas flow. This separation is limited to a short portion of the conduit, so that the component flows are only temporarily separated for the purpose of effecting certain measurements on the flow. On leaving the meter the flow components are free to re-combine. The pitot-static tube 13 is operative to measure the differential pressure head of the gas flow, in conventional fashion. The signals produced are transmitted to the microprocessor 9 which is governed by a data reduction program comprising correlating calibrations for the orifice signal and the pitot tube signal. The mass flow rates of liquid and gas, the quality and the total mass flow rate may be computed and displayed by the computer 9.

Usually, in the metering of two-phase flow, it is necessary to measure additional parameters, such as the static pressure of the stream and/or the temperature. As will become evident from the description to follow, this third parameter is usually needed in order to correlate the above two pressure drop measurements with the individual flowrates of the two phases. This correlation includes physical properties such as the density and viscosity of each of the two phases. In a one-component two-phase stream such as wet steam, a measurement of static pressure or temperature of the stream allows one to calculate the density and viscosity of each phase. With wet steam for instance, standard steam tables may be used. In a two-component two-phase stream both a temperature and static pressure measurement may be needed.

Notwithstanding the above description of the preferred embodiment of the meter and the particular arrangement shown, it is to be understood that the order of the two measuring elements is immaterial, and the operation of the meter does not depend on this order, and they may be interchanged if desired.

Although the use of a conventional pitot-static tube for the measurement of gas velocity has been demonstrated, it is to be understood that other devices for measuring gas velocity may be equally applicable, for example, turbine meters, drag discs, anenometers, or vortex meters, in cases where their use might be practical.

The following example is included to demonstrate the operability of the preferred embodiment of the flowmeter, and to show the types of calculations involved in correlating the flowmeter measurements with the individual flowrates of the two phases.

EXAMPLE

A flowmeter as shown in FIGS. 1 and 2 was constructed in accordance with Table 1.

TABLE 1

Typical Dimensions and Materials Associated with a Particular Embodiment of the Two-Phase Flowmeter

| Component | Size | Material |
|---|---|---|
| Pipe | 2" - sch 160<br>$L_1$ = 60"<br>$L_2$ = 8.7"<br>$L_3$ = 20.7"<br>$L_4$ = 23.0" | ASTM A-106 |
| Flanges | Standard 2" 1500 lb rating design per ASA B 16.5 | ASTM A-105 |
| Pressure Taps | diam. - $\frac{3}{8}$" | |
| Orifice | Designed to ASME<br>D = 1.64"<br>d = 0.918"<br>t = $\frac{1}{8}$" | 300 Series SS |
| Coil | $D_p$ = 1.39"<br>$D_s$ = 0.625"<br>$D_c$ = 0.25"<br>p = 1.64"<br>$L_c$ = 30.6" | 300 Series SS |
| Shielded pitot-static tube | $D_t$ 1/16"<br>$t_t$ = 0.033"<br>$L_5$ = 1.125"<br>$L_6$ = 0.625"<br>$L_7$ = 0.375"<br>$L_8$ = 0.625"<br>$L_9$ = 0.760"<br>$L_{10}$ = 0.375"<br>$L_{11}$ = 0.945"<br>$L_{12}$ = 0.711"<br>$L_{13}$ = 0.060"<br>$L_{14}$ = 0.585"<br>$L_{15}$ = 0.125"<br>$L_{16}$ = 0.250"<br>$L_{17}$ = 0.935"<br>$L_{18}$ = 1.142"<br>$L_{19}$ = 0.488"<br>$L_{20}$ = 1.375"<br>$L_{21}$ = 0.176" | 300 Series SS |

MATHEMATICAL SOLUTION

Governing Equations

Figure 6:
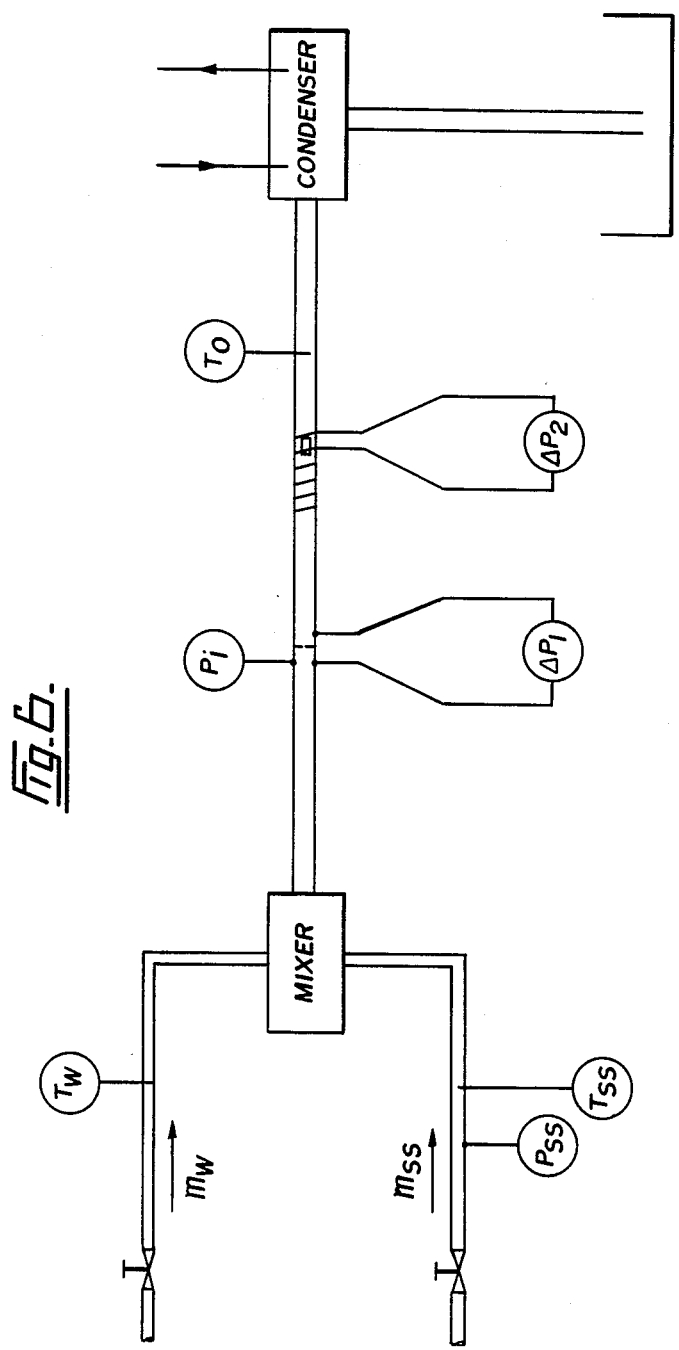
FIG. 6 is a schematic of the experimental set-up used to test the flowmeter. DESCRIPTION OF THE PREFERRED EMBODIMENT The flowmeter in accordance with the invention has been developed and tested in connection with monitoring wet steam and also air-water flows. It is believed that it can also be applied to other flowing two-phase mixtures, such as gas with oil, and other gas-liquid flows. It may also be useful with three-phase flow, in which solid particles are carried in solution or suspension. In any case, it is described hereafter in connection with a model used with set steam.

For the meter depicted in FIG. 1, and the experimental apparatus depicted in FIG. 6, six equations can be applied to the meter elements for the purpose of determining the total mass flowrate and quality.

Three governing equations are applied to the orifice plate meter to determine the total mass flowrate $M_t$, quality x and effective quality $x_e$ as follows:

$$M_t = C_d \, Y \, F_a a \sqrt{\frac{2g_c \Delta p_1}{(1 - \beta^4) v_e}} \quad (1)$$

where
$C_d$ is the orifice discharge coefficient;
Y is the orifice plate fluid expansion factor;
$F_a$ is the orifice area thermal expansion factor;
a is the orifice area;
$g_c$ is the proportionality constant;
$\Delta p_1$ is the pressure difference measured across the orifice plate;
$\beta$ is the ratio of orifice to pipe diameter;
$v_e$ is the effective specific volume of the fluid.

$$v_e = v_f + x_e v_{fg} \quad (2)$$

where
$v_f$ is the saturated liquid specific volume;
$v_{fg}$ is the specific volume difference between the saturated gas and saturated liquid;
$x_e$ is the effective mass quality of the fluid.

$$x_e = C_1 x^{C_2} \quad (3)$$

where
$C_1$ and $C_2$ are effective quality constants dependent upon specific meter geometries the determination of which will be hereinafter detailed.
x is the true mass quality of the fluid.

The equations governing the pitot-static tube and applied thereto to determine the apparent gas mass flowrate ($M_{gtp}$), the gas mass flowrate ($M_g$), and total mass flowrate ($M_t$), are as follows:

$$M_{gtp} = C_3 (0.817) \frac{\pi}{4} (D^2 - d_c^2) \sqrt{\frac{2\Delta P_2}{V_{gp}}} + C_4 \quad (4)$$

where
$C_3$ and $C_4$ are empirical constants for a particular fluid and specific meter geometry. $C_4$ will have the units of mass flow.
0.817 is the theoretical ratio of average velocity to centre-line velocity;
$\pi/4$ ($D^2 - d_c^2$) is the flow area of the fluid;
$V_{gp}$ is the specific volume of the gas phase at the pitot;
$\Delta P_2$ is the dynamic pressure at the shielded pitot-static tube.

$$M_g = M_{gtp} \left[ \frac{1}{C_5 + C_6 \left( \frac{1-x}{x} \right)} \right] \quad (5)$$

where
$C_5$ and $C_6$ are empirical constants for a particular fluid and a specific geometry.

$$M_t = M_g / x \quad (6)$$

The modelling of the empirical constants $C_3, C_4, C_5$ and $C_6$, which models relate to the pitot-static tube, will be outlined hereafter.

Parameters $C_d$, Y, $F_a$, a and $\beta$ are computed in accordance with established procedures, as set forth in, for example, 'Fluid Meters—Their Theory and Application', ASME Report, 6th ed. 1971.

Fluid properties are based on static pressure measurements, and, in the case of steam-water flows, numerical examples may be obtained, for example from 'ASME Steam Tables', 1967.

Parameters $\Delta p_1$ and $\Delta p_2$ are the actual pressure difference measurements effected at the meter and determined through the use of conventional pressure sensing devices.

By substituting equations (2) and (3) into equation (1), the total mass flowrate ($M_t$) through the orifice is modelled in the following form:

$$M_t = C_d\, Y F_a\, a \sqrt{\frac{2 g_c \Delta P_2}{(1 - \beta^4)(V_f + C_1 \times C_2 V_{fg})}} \quad (7)$$

The total mass flowrate ($M_t$) at the pitot-static tube is modelled by substitution of equation (4) and (5) into equation (6).

$$M_t = \left[\frac{C_3\left[.817\frac{\pi}{4}(D_2 - d_c^2)\right]\sqrt{\frac{2g_c \Delta P_1}{V_{gp}}} + C_4}{C_5 + C_6\left(\frac{1-x}{x}\right)}\right]\frac{1}{x} \quad (8)$$

Ultimately, the total mass flow rate $M_t$, and the quality x are determined by the simultaneous solution of equations (7) and (8) for the values thereof. It will be apparent, therefore, that the total mass flowrate ($M_t$) will be equivalent for each device, under the measured process conditions.

SAMPLE CALCULATIONS

Actual test results and associated calculations are reproduced below for illustrative purposes.

The following results were recorded using the system shown schematically in FIG. 6, and the related dimensions given in Table 1.

Controlled Process Conditions:
$m_w = 0.0555$ lbm/s
$T_w = 72.7°$ F.
$m_{ss} = 0.2264$ lbm/s
$P_{ss} = 36.0$ psia
$T_{ss} = 264.4°$ F.
where
$m_w$ is the subcooled water mass flowrate;
$T_w$ is the subcooled water temperature;
$m_{ss}$ is the superheated steam mass flowrate;
$P_{ss}$ is the static pressure of the superheated steam;
$T_{ss}$ is the superheated steam temperature.
The process parameters measured were as follows:
$P_i = 32.33$ psia
$\Delta p_1 = 9.99$ psi
$\Delta p_2 = 3.21$ psi
$T_o = 221°$ F.
where
$P_i$ is the static pressure upstream of the orifice plate;
$T_o$ is the temperature at the meter outlet (measured for verification only).

Additional instrumentation for experimental verification of test results was included in the actual test loop.

Calculation gives the Actual Total Mass Flowrate $M_{ta}$ and quality at the meter from the controlled process conditions as follows:

$$M_{ta} = m_w + m_{ss} \quad (9)$$
$$= .0555 + .2264$$
$$= .2819\ \text{lbm/s}$$

From enthalpy balance calculations, considering any losses as negligible, we can calculate an actual homogeneous quality at the meter as:

$$m_w h_w + m_{ss} h_{ss} = M_{ta}(h_f + x_a h_{fg})$$

or, $$x_a = \frac{M_w h_w + M_{ss} h_{ss}}{M_{ta}\, h_v} - \frac{h_f}{h_v} \quad (10)$$

where
$h_w$ is the specific enthalpy of compressed water;
$h_{ss}$ is the specific enthalpy of superheated steam;
$h_f$ is the saturated liquid specific enthalpy;
$x_a$ is the actual quality of the two-phase mixture;
$h_v$ is the specific enthalpy of vaporization.

From the ASME Steam Tables
$h_w = 40.87$ Btu/lb (before mixer)
$h_{ss} = 1175.0$ Btu/lb (before mixer)
$h_f = 223.4$ Btu/lb (at 32.3 psia)
$h_v = 949.4$ Btu/lb (at 32.3 psia)

which inserted into equation (10) yields, $$x_a = \frac{(.0555)(40.874) + (.2264)(1175)}{(.2819)(949.4)} - \frac{223.4}{949.4}$$

$$= 0.767$$

ORIFICE METER PARAMETERS

The orifice meter parameters were determined by the procedures as outlined for example in Fluid Meters—Their Theory and Application, ASME Report, 6th ed. 1971.

The experimental results are detailed as follows.

The ratio of orifice to pipe diameter $\beta$ was determined as follows:

$$\beta = \frac{d}{D} = \frac{0.918}{1.640} = 0.560 \quad (11)$$

where
$\beta$ is the ratio of the orifice to pipe diameter
d is the orifice diameter;
D is the pipe diameter.

The expansion factor Y was determined as follows. The compressibility of the metered fluid is given by:

$$Y = 1 - (0.41 + 0.35\beta^4)(1 - r)/\gamma \quad (12)$$

where
r is the ratio of downstream to upstream pressures across the orifice plate;
$\gamma$ is the ratio of specific heats.
and $$1 - r = \frac{\Delta p_1}{p_1} = \frac{9.9908}{32.327} = 0.30905 \quad (13)$$

$$\gamma = C_p/C_v = 1.329\ \text{(steam)} \quad (14)$$

$$\therefore Y = 1 - (0.41 + 0.35\, (0.56)^4)\left(\frac{0.30905}{1.329}\right)$$

$$= 0.8967$$

where
C$_p$ is the specific heat at constant pressure;
C$_v$ is the specific heat at constant volume.

The thermal expansion factor F$_a$ was calculated by considering the saturation temperature which corresponds to pressure p$_i$, that is:

$$T_{sat_i} = 254.6° \text{ F. (for } p_i = 32.327)$$

and $$F_a = 1.0035 \text{ (for a stainless steel orifice plate)}$$

The orifice area a is given by:

$$a = \frac{\pi d^2}{4} = \frac{\pi (0.918)^2}{4} \quad (15)$$

The gravitational constant g$_c$ is given by:

$$g_c = 32.174 \frac{lb_m - ft}{lb_f - s^2}$$

The orifice discharge coefficient, C$_d$, accounts for the difference between the theoretical and actual mass flowrate through the orifice, as follows:

$$C_d = K\sqrt{1 - \beta^4} \quad (16)$$

where $$K = K_o(1 + A/Re_d) \quad (17)$$

$$K_o = K_e[(10^6 d)/(10^6 d + 15A)] \quad (18)$$

$$K_e = 0.5993 + \frac{0.007}{D} + \left(0.364 + \frac{0.076}{\sqrt{D}}\right)\beta^4 + \quad (19)$$

$$0.4\left(1.6 - \frac{1}{D}\right)^5 \left[\left(0.07 + \frac{0.5}{D}\right) - \beta\right]^{5/2} -$$

$$\left(0.009 + \frac{0.034}{D}\right)(0.5 - \beta)^{3/2} + \left(\frac{65}{D^3} + 3\right)(\beta - 0.7)^{5/2}$$

where
K is the flow coefficient
K$_o$ is the limiting value of K for specific pipe diameter D and ratio of orifice to pipe diameter $\beta$
and
K$_e$ is the particular value of K
when
Re$_d$ = 10$^6$a/15.

$$A = d\left(830 - 5000\beta + 9000\beta^2 - 4200\beta^3 + \frac{530}{\sqrt{D}}\right) \quad (20)$$

where
A is the parameter in flow coefficient equation.

$$Re_d = Re_D/\beta \quad (21)$$

where
Re$_d$ is the orifice Reynold's number;
Re$_D$ is the pipe Reynold's number.

$$Re_D = \frac{48 M_t}{\pi \mu D} \quad (22)$$

where
$\mu$ is computed as the homogeneous viscosity for the mixture, and given as:

$$\mu = \frac{1}{\frac{x}{\mu_g} + \frac{1-x}{\mu_f}} \quad (23)$$

$\mu$ is the absolute homogeneous viscosity of the two-phase mixture;
$\mu_f$ is the absolute viscosity of the saturated liquid;
$\mu_g$ is the absolute viscosity of the saturated gas.

Clearly since $\mu$ or Re$_d$ are unknown, it is necessary to iterate. Therefore, as a first approximation, let C$_d$ = 0.615.

The specific volumes v$_f$ and v$_{fg}$ are determined as follows:
v$_f$ = 0.01715 ft$^3$/lbm
v$_{fg}$ = 12.822 ft$^3$/lbm (at p = 32.327 psia)

The effective quality constants C$_1$ and C$_2$ as determined hereinafter are found to be as follows:
C$_1$ = 1.0263
C$_2$ = 1.7362

THE PITOT-STATIC TUBE PARAMETERS

The empirical constants C$_3$, C$_4$, C$_5$, C$_6$ as determined hereinafter are given as:
C$_3$ = 0.004018
C$_4$ = 0.04127 lbm/s
C$_5$ = 1.01598
C$_6$ = 0.3836

SOLUTION FOR TOTAL MASS FLOWRATE AND QUALITY

Combining the total mass flowrate equations for the orifice and pitot-static tube, equations (7) and (8) respectively, allows:

$$M_{t\,orifice} = M_{t\,pitot}$$

$$\frac{C_d Y F_a a}{12} \sqrt{\frac{2 g_c \Delta P_1}{(1 - \beta^4)(V_f + C_1 \times C_2 V_{fg})}} = \frac{C_3 H_w + C_4}{C_5 + C_6\left(\frac{1-x}{x}\right)} \cdot \frac{1}{x} \quad (24)$$

where $$H_w = (0.817)\frac{\pi}{4}(D^2 - d_c^2)\sqrt{\frac{2\Delta P_2 g_c}{V_{gp}}} \quad (25)$$

V$_{gp}$ = 16.41 ft$^3$/lbm for P$_2$ = 24.83 psia
the pressure at the pitot static tube (P$_2$) is estimated by P$_2$ = P$_1$ − 0.75 ($\Delta$P$_1$).
since for an orifice where $\beta$ = 0.56 the overall pressure loss is 75% of the measured differential pressure (source: Fluid Meters—Their Theory and Application, ASME Report, 6th ed. 1971).

To obtain an accurate value for $C_d$ iteration was necessary. The only unknown in the above equation is x, so we substitute numerical values for all invariant terms, for this particular set of measurements, and simplify; viz:

$$\left[\frac{YF_a a}{\sqrt{1-\beta^4}}\right]^2 = \left[\frac{(0.8967)(1.0035)(0.6619)}{\sqrt{1-(.56)^4}}\right]^2 = 0.3934$$

$2g_c = 64.348$ $\Delta p_1 = 0.9908$ $H_w = .817 \times \frac{\pi}{4} \times$ $(1.64^2 - .25^2)\sqrt{\frac{2 \times 3.2116 \times 32.174 \times 144}{16.413}} = 71.780 \text{ lb/s}$ which, after substitution into equation (24), and following algebraic manipulation yields, $$C_d(.0496)\sqrt{\frac{713.01}{(.01715 + 13.142 \times 1.7362)} - \frac{0.2471}{1.01598 + .3836\left(\frac{1-x}{x}\right)} \cdot \frac{1}{x}} = 0 \quad (26)$$

This equation (for a given $C_d$), can now be solved iteratively for x, which in turn will yield $M_t$ through either equation (7) or (8). The computed total mass flowrate $M_t$ is then used to correct the discharge coefficient $C_d$, and subsequent iterations can be performed until satisfactory accuracy has been achieved. Results of the iterations are given in Table 2.

TABLE 2

| | Solution for Total Mass Flowrate and Quality | | | |
|---|---|---|---|---|
| Iteration | Discharge Co-efficient | Quality | EQ (26) Residue | Total Mass Flowrate | Reynold's Number |
| | $C_d$ | X | | $M_t$ | $R_e$ |
| 0 | 0.615 | .5 | 0.056 | | |
| | | .7 | 0.007 | | |
| | | .8 | −0.006 | | |
| | | .75 | 0.000 | .288 | 406572 |
| 1 | 0.609 | .75 | −0.003 | | |
| | | .72 | 0.001 | | |
| | | .73 | 0.000 | .292 | |
| | $X_{metered} =$ 0.73 | | | $M_t =$ .292 lbm/s | |

Comparison of the metered total mass flowrate and quality with the actual expected values as computed yields:

| | |
|---|---|
| $M_{t expected} =$ | 0.2819 lbm/s |
| $M_{t metered} =$ | 0.292 lbm/s |
| error = | 3.6% |
| $x_{expected} =$ | 0.767 |
| $x_{metered} =$ | 0.73 |
| error = | −4.8% |

THE DETERMINATION OF CALIBRATION CONSTANTS

The constants $C_1$ to $C_6$ are obtained by the calibration of the flowmeter against the known inlet conditions through the operating range of the meter. Known inlet conditions would be defined as the known total mass flowrate and quality of the flow stream. Quality of flow (x) is defined by the following terms $$x = \frac{W_g}{W_g + W_f} \quad (27)$$

where $W_g$ is the individual gas flowrate; and
$W_f$ is the individual liquid flowrate.

Such a calibration would be performed a single time for a particular fluid and meter geometry.

The determination of the calibration constants given and illustrated hereinafter is described, for clarity, with respect to wet steam flow, and a particular embodiment of the meter.

The calculations assume steam water flow through a two-phase flowmeter as depicted in FIG. 1.

ORIFICE PLATE CALIBRATION CONSTANTS $C_1$ AND $C_2$

The total mass flowrate $M_t$ in two phase flow is modelled by replacing the single phase specific volume v by the effective specific volume $v_e$ in the orifice plate mass flow equation as shown in equation (1). By measuring the pressure difference $\Delta p_1$ across the orifice plate and knowing the total mass flowrate from the inlet conditions, the effective specific volume $v_e$ can be readily computed.

The effective quality $x_e$ at the orifice plate is determined by substituting the effective specific volume $v_e$ into equation (2).

Saturated fluid properties $v_f$ and $v_{fg}$ are modelled from the static pressure measurements preferably, on the upstream side of the orifice plate.

It is assumed that the liquid and gas phases are saturated and in thermal equilibrium with one another.

The actual experimental quality x can be determined from the known water and steam inputs and temperature measurements, and, for example, a pressure measurement before the meter. This actual quality, x, is then modelled with the effective quality, $x_e$ using equation (3). The correlation constants, $C_1$ and $C_2$, for the orifice meter are found using regression analysis.

Figure 3:
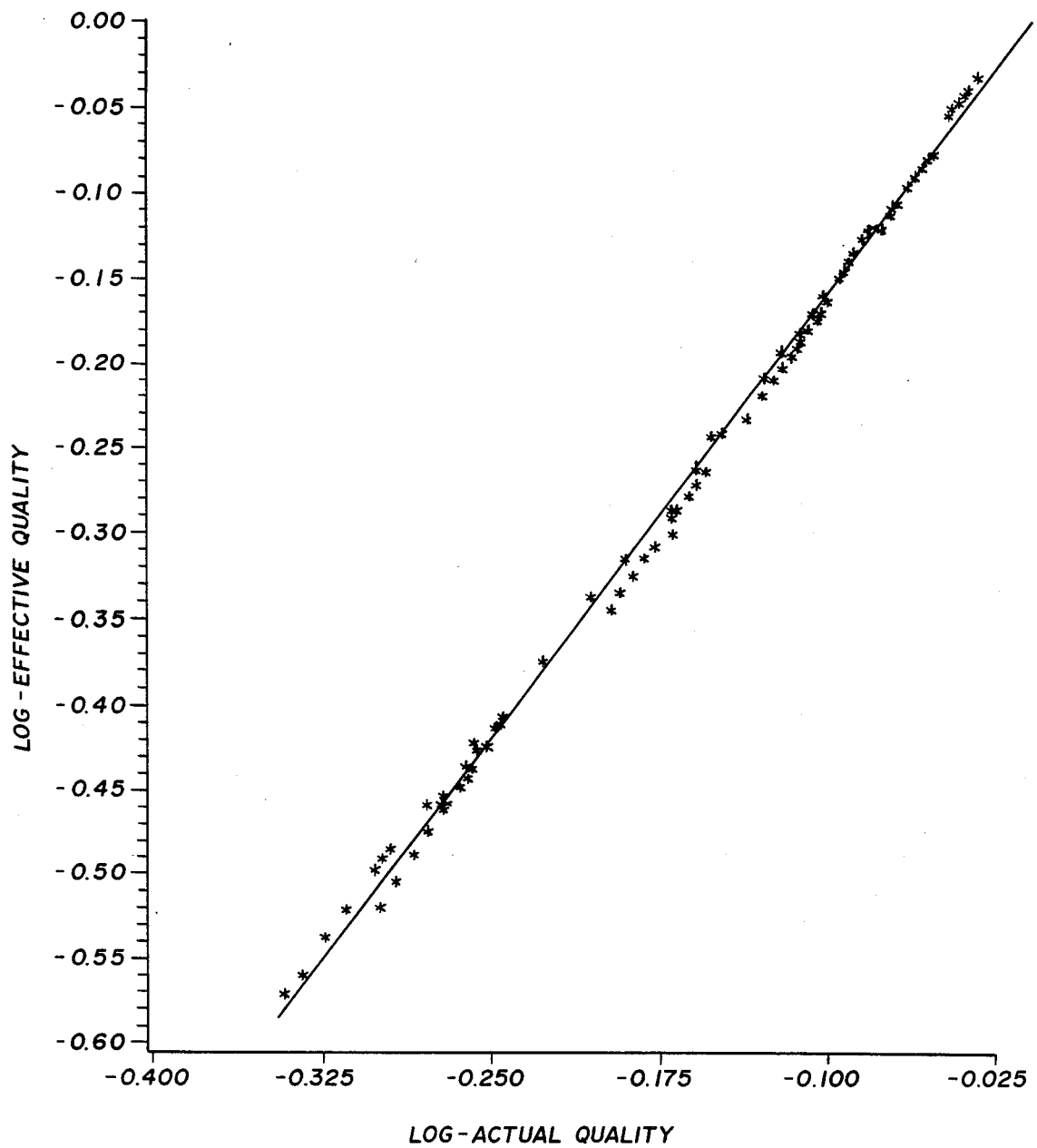
FIG. 3 is a plot showing the Effective Quality $x_e$ of the total flow versus the Actual Quality x, of the total flow as measured at the orifice meter which plot is utilized in the computation of meter constants.

FIG. 3 exemplifies this analysis in showing a log-log plot of $x_e$ versus x for a series of two-phase flows at pressures ranging from 20 to 40 psia and qualities ranging between 50%–95%.

A least squares fit on this data yielded the following results:

$x_e = [1.0263 \times^{1.7362}]$ or, in terms of constants $C_1$ and $C_2$:

$C_1 = 1.0263$ and $C_2 = 1.7362$.

SHIELDED PITOT-STATIC TUBE CALIBRATION CONSTANTS $C_3$, $C_4$, $C_5$, $C_6$

Under conditions of single-phase steam flow, the dynamic pressure measurement from the shielded pitot-static tube can be correlated with the total mass flowrate through the meter. Therefore, by passing several known single-phase steam flowrates $M_g'$ through the meter and measuring the resultant dynamic pressures $\Delta p_2$, the equivalent head of water $H_w$ is derived as follows:

$$H_w = (0.817) \frac{\pi}{4} (D_2 - d_c^2) \sqrt{2\Delta P_2 \rho_G g_c}$$

Figure 4:
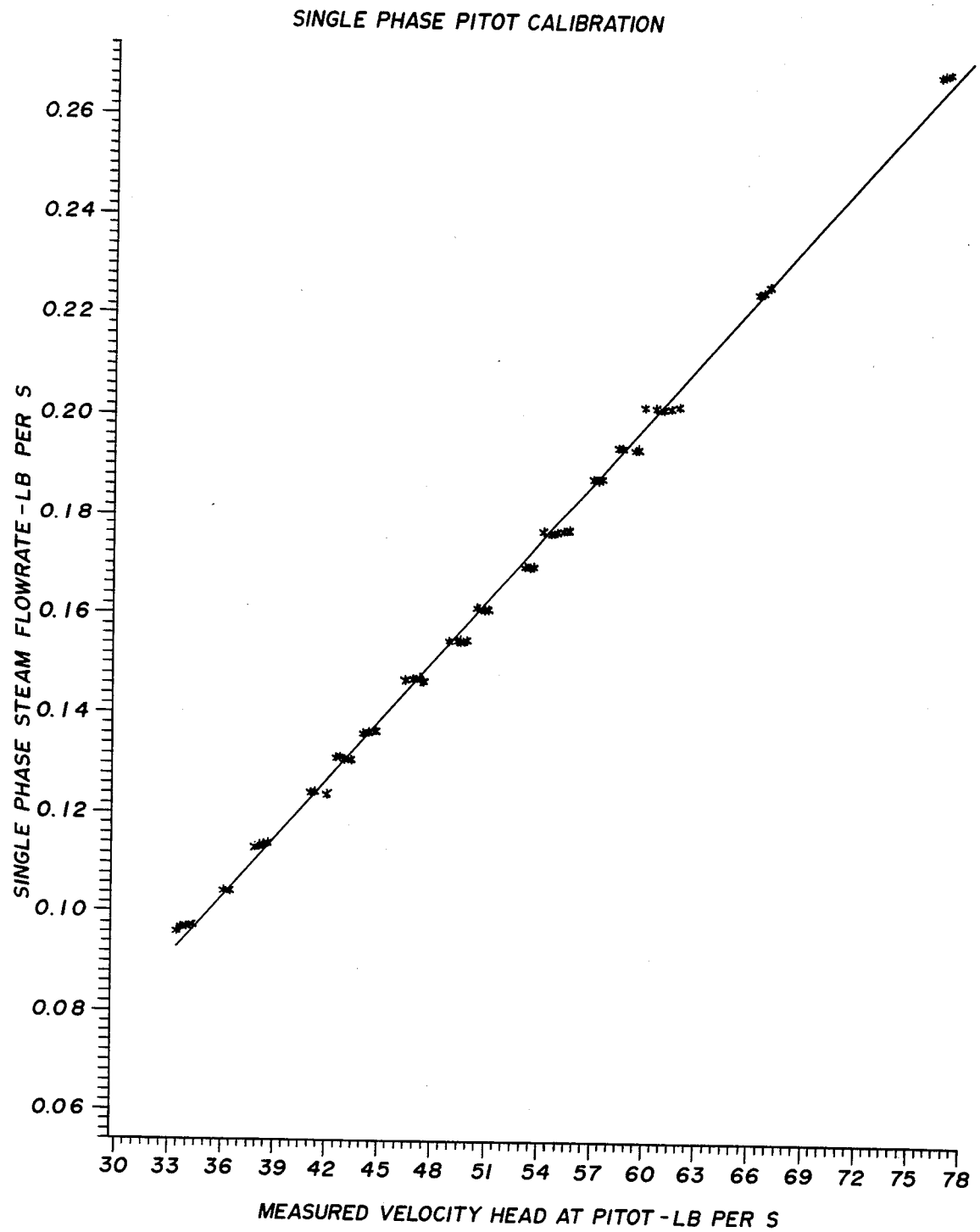
FIG. 4 is a plot showing the relationship between the measured velocity head at the pitot tube versus the actual Single Phase Steam Mass Flowrate $M_g$, which plot is utilized in the specific meter calibrations as exemplified with wet steam flow.

The results for the calibration constants were modelled by following linear least squares equations on the data as indicated in FIG. 4 to give:

$$M_g' = 0.004018 H_w - 0.04127$$

Under two-phase flow conditions, the dynamic pressure measurement provided by the pitot-static tube is not an accurate measure of the true gas mass flowrate flowing through the meter. The term apparent gas mass flowrate $M_{gtp}$ is introduced and replaces $M_g'$ in single phase steam flow as apparent and actual gas mass flowrates are equivalent to give:

$$M_{gtp} = C_3 H_w + C_4$$

where $C_3 = 0.004108$ and $C_4 = -0.04127$.

An additional mathematical model is required to correlate the apparent gas mass flowrate $M_{gtp}$ with the actual gas mass flowrate $M_g$ in metering two-phase flow as, with decreasing quality, the area occupied by the liquid flow increases relative to the area available for gas flow. For a fixed gas flowrate, an increased dynamic pressure reading would therefore result. The effects of quality are predicted by use of the following models.

$$\frac{M_{gtp}}{M_g} = C_5 + C_6 \left( \frac{1-x}{x} \right)$$

Figure 5:
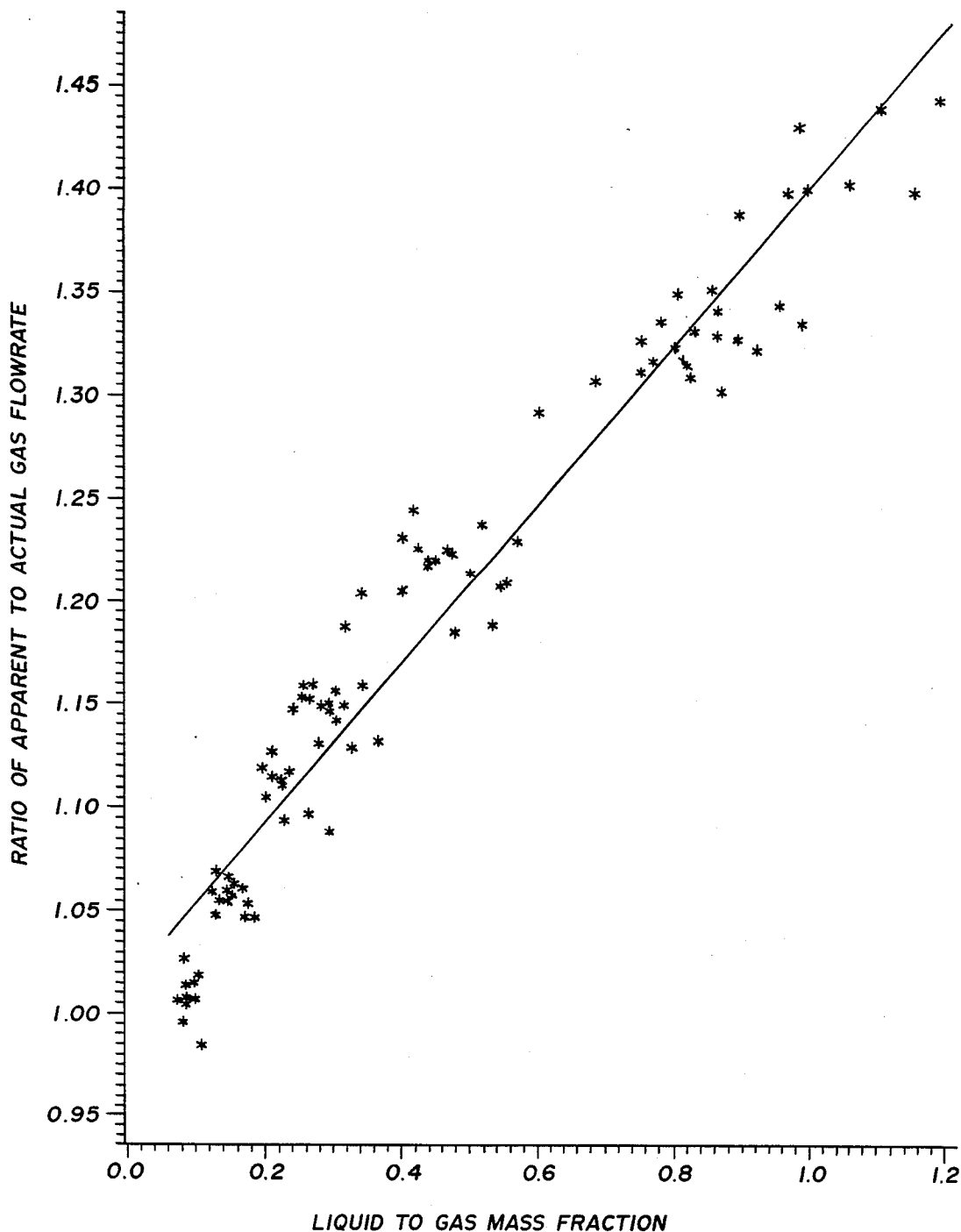
FIG. 5 graphically depicts the relationship between the ratio of Apparent to Actual Gas Mass Flowrate versus the Liquid to Gas Mass Fraction, which graph is employed in the calculation of meter parameters.

FIG. 5 exemplifies graphically the aforementioned linear relationship, between apparent and actual gas mass flowrates.

The calibration constants $C_5$ and $C_6$ are derived by a modelling of linear least squares equations upon the data expressed in FIG. 5 to provide:

$$\frac{M_{gtp}}{M_g} = 1.01598 + 0.3836 \left( \frac{1-x}{x} \right)$$

Rearranging the abovementioned equation gives $M_g$ as follows:

$$M_g = M_{gtp} \frac{1}{C_5 + C_6(1-x)/x}$$

where $C_5 = 1.01598$ and $C_6 = 0.3836$.

The operating range of the preferred embodiment of the two-phase flowmeter encompasses both annular flow and wavy flow. This technique of metering and correlating proved effective and accurate in flows having a quality ranging from 50 to 100%.

While the present invention has been disclosed in connection with the preferred embodiment thereof, it should be understood that there may be other embodiments which fall within the spirit and scope of the invention as defined by the following claims.

The embodiments of the invention in which an exclusive property or privilege is claimed are defined as follows:

1. A flowmeter for measuring two different physical parameters of a gas and liquid mixture flow passing through a conduit, which measurements may be used to determine the individual gas and liquid flowrates, comprising:
   means for causing a frictional or accelerational pressure change in the total flow and measuring such pressure change;
   and means for separating the mixture into individual gas and liquid phase flows within the same conduit and measuring a pressure difference indicative of the velocity of the gas flow.

2. The flowmeter for measuring two different physical parameters of a gas and liquid mixture flow passing through a conduit, which measurements may be used to determine the individual gas and liquid flowrates, comrising:
   means for causing a frictional or accelerational pressure change in the total flow, measuring such pressure change, and producing a signal proportional to such pressure change;
   means for separating the mixture into individual gas and liquid phase flows within the same conduit, measuring a pressure diffference indicative of the velocity of the gas flow, and producing a signal proportional to such pressure difference.

3. The flowmeter as set forth in claim 2 comprising:
   means for receiving said signals, calculating the individual liquid and gas flowrates, and displaying said flowrates.

4. A tubular flowmeter for measuring two different physical parameters of a gas and liquid mixture flow passing through a conduit, said flowmeter being adapted to form part of said conduit, which measurements may be used to determine the individual gas and liquid flowrates, comprising:
   first means for causing an accelerational or frictional pressure change in the total flow, said means being selected from the group consisting of an orifice plate, a venturi, a flow nozzle, and a twisted tape;
   second means for measuring such pressure change;
   third means for producing a signal proportional to such pressure change;
   fourth means, operative to induce rotational motion of the mixture, for separating said mixture into discrete gas and liquid flows within the same conduit;
   fifth means for measuring a pressure difference indicative of the velocity of the gas flow, said means comprising a pitot-static tube assembly having its axis substantially at the axis of the tubular flowmeter and its entrance positioned within the region of separated flows;
   sixth means for producing a signal proportional to such velocity head; and
   seventh means for receiving said signals, calculating the individual liquid and gas flowrates, and displaying said flowrates.

5. The flowmeter as set forth in claim 4 wherein:
   the fourth means comprises a rib extending helically along the inner surface of the flowmeter.

6. The flowmeter as set forth in claim 5 wherein:
   the depth of said rib ranges from about one-quarter to one-tenth of the diameter of said conduit and has a pitch of about one-half to three diameters.

7. A tubular flowmeter for measuring two different physical parameters of a gas and liquid mixture flow passing through a conduit, said flowmeter being adapted to form part of said conduit, which measurements may be used to determine the individual gas and liquid flowrates, comprising:
   a tubular body forming a flow passage;
   an orifice plate, mounted in the body across the passage, for causing an accelerational pressure drop in the total flow;
   second means associated with the body, for measuring such pressure drop;
   a rib, extending helically along the inner surface of the body, downstream of the orifie plate, for inducing rotational motion of the mixture to cause it to separate into discrete gas and liquid flows within the same conduit; and
   a pitot-static tube assembly, associated with the body and having its axis substantially at the axis of the passage and its entrance positioned so as to be at the centre of the gas flow, for measuring a pressure head indicative of the velocity of the gas flow.

8. The flowmeter as set forth in claim 7 wherein:
   the depth of said rib ranges from about one-quarter to one-tenth of the diameter of said passage and has a pitch of about one-half to three diameters.

* * * * *